US012705829B2

(12) United States Patent
He et al.

(10) Patent No.: US 12,705,829 B2
(45) Date of Patent: Aug. 11, 2026

(54) METHODS, STORAGE MEDIA, AND SYSTEMS FOR GENERATING A THREE-DIMENSIONAL LINE SEGMENT

(71) Applicant: Hover Inc., San Francisco, CA (US)

(72) Inventors: Hongyuan He, San Francisco, CA (US); Harsh Barbhaiya, San Francisco, CA (US); Jeffrey Sommers, San Francisco, CA (US)

(73) Assignee: Hover Inc., San Francisco, CA (US)

( * ) Notice: Subject to any disclaimer, the term of this patent is extended or adjusted under 35 U.S.C. 154(b) by 167 days.

(21) Appl. No.: 18/705,101

(22) PCT Filed: Oct. 25, 2022

(86) PCT No.: PCT/US2022/078673
§ 371 (c)(1),
(2) Date: Apr. 26, 2024

(87) PCT Pub. No.: WO2023/076913
PCT Pub. Date: May 4, 2023

(65) Prior Publication Data

US 2025/0029326 A1 Jan. 23, 2025

Related U.S. Application Data

(60) Provisional application No. 63/419,016, filed on Oct. 25, 2022, provisional application No. 63/273,591, filed on Oct. 29, 2021.

(51) Int. Cl.
*G06T 17/00* (2006.01)
*G06T 7/13* (2017.01)
(Continued)

(52) U.S. Cl.
CPC ................ *G06T 17/00* (2013.01); *G06T 7/13* (2017.01); *G06V 10/26* (2022.01); *G06V 10/422* (2022.01);
(Continued)

(58) Field of Classification Search
CPC ... G06T 2207/10028; G06T 7/73; G06T 7/11; G06T 7/13; G06T 17/00; G06T 7/70;
(Continued)

(56) References Cited

U.S. PATENT DOCUMENTS

2016/0104314 A1* 4/2016 Nakazato ................ G06T 17/00 382/285
2018/0322698 A1 11/2018 Fathi et al.
(Continued)

FOREIGN PATENT DOCUMENTS

CN 105844629 A 8/2016
CN 111932671 A 11/2020
WO 2020006551 A1 1/2020

OTHER PUBLICATIONS

Supplementary European Search Report dated Aug. 4, 2025 for application No. EP22888442.5.
(Continued)

*Primary Examiner* — Xiao M Wu
*Assistant Examiner* — Scott E Sonners

(57) ABSTRACT

Methods, storage media, and systems for generating a three-dimensional line segment are disclosed. Exemplary implementations may: receive a plurality of images; generate a point cloud based on the plurality of images; detect a two-dimensional line segment in a first image; project a set of 3d points of the plurality of 3d points as 2d points in the first image; select projected 3d points that are proximate to 2d points along the 2d line segment; and generate a 3d line
(Continued)

segment by connecting 3d points of the point cloud represented by the selected projected 3d points.

21 Claims, 15 Drawing Sheets

(51) Int. Cl.
*G06V 10/26* (2022.01)
*G06V 10/422* (2022.01)
*G06V 10/44* (2022.01)
*G06V 10/764* (2022.01)
*H04N 5/74* (2006.01)

(52) U.S. Cl.
CPC ............ *G06V 10/44* (2022.01); *G06V 10/764* (2022.01); *H04N 5/74* (2013.01)

(58) Field of Classification Search
CPC .. G06T 7/12; G06T 7/246; G06T 7/33; G06T 7/593; G06T 2207/10012; G06T 7/60; G06T 7/55; G06T 17/05; G06T 7/80; G06T 7/50; G06T 7/10; G06T 19/006; G06T 19/00; G06T 2200/04; G06T 7/337; G06T 15/20; G06T 2200/08; G06T 2207/10032; G06T 7/579; G06T 2207/20221; G06T 2207/10004; G06T 2207/30184; G06T 15/205; G06T 7/00; G06T 7/174; G06T 15/00; G06T 2215/16; G06T 3/14; G06T 17/205; G06T 2207/20212; G06T 7/38; G06T 2207/20192; G06V 20/10; G06V 10/44; G06V 10/462; G06V 20/647; G06V 20/176; G06V 20/70; G06V 10/751; G06V 10/24; G06V 10/757; G06V 20/13; G06V 20/17; G06V 20/39; G06V 10/752
See application file for complete search history.

(56) References Cited

U.S. PATENT DOCUMENTS

| | | | |
|---|---|---|---|
| 2020/0005486 A1 | 1/2020 | Sinha et al. | |
| 2020/0175753 A1* | 6/2020 | Bae | G06T 11/203 |
| 2021/0398346 A1* | 12/2021 | Valladolid | G06F 16/41 |

OTHER PUBLICATIONS

PCT Search Report & Written Opinion dated for application No. PCT/US2022/078673.

* cited by examiner

1010

1000

METHODS, STORAGE MEDIA, AND SYSTEMS FOR GENERATING A THREE-DIMENSIONAL LINE SEGMENT

CROSS-REFERENCE TO RELATED APPLICATIONS

The present application claims priority to U.S. Provisional Application No. 63/273,591 filed on Oct. 29, 2021 entitled "SYSTEMS AND METHODS FOR 3D LINE SEGMENT GENERATION", and U.S. Provisional Application No. 63/419,016 filed on Oct. 25, 2022 entitled "METHODS, STORAGE MEDIA, AND SYSTEMS FOR GENERATING A THREE-DIMENSIONAL LINE SEGMENT", which are hereby incorporated by reference in their entirety.

BACKGROUND

Field of the Invention

The present disclosure relates to methods, storage media, and system for generating a three-dimensional line segment.

Description of the Related Art

A line cloud is a set of line segments in a three-dimensional (3D) coordinate system. The line cloud can represent co-visible line segments across images. Generating a line cloud based on images can include implementing one or more techniques that utilizes the images to construct a 3D structure (i.e., the line cloud). One way to generate a line cloud is by matching two-dimensional (2D) line segments across images. One such approach includes detecting a first 2D line segment in a first image, detecting a second 2D line segment in a second image, and triangulating the first 2D line segment and the second 2D line segment in a 3D coordinate system thereby generating a 3D line segment that corresponds to the first 2D line segment and the second 2D line segment.

An underlying assumption of this approach is that the first 2D line segment and the second 2D line segment represent the same real-world line segment, or portion thereof. Figure (FIG. 1A illustrates an example ground-level capture of building structure 102, according to some embodiments. First image 104 illustrates an image of the front of building structure 102 and second image 106 illustrates an image of the corner of building structure 102. First 2D line segment 108 is detected in first image 104 and second 2D line segment 110 is detected in second image 106. In this example, first 2D line segment 108 and second 2D line segment 110 represent the same real-world line segment, or portion thereof. Specifically, first 2D line segment 108 and second 2D line segment 110 represent eave 120 of building structure 102, where camera 124 captured first image 104 and camera 126 captured second image 106. End points 112 and 114 of first 2D line segment 108 of first image 104 correspond to end points 116 and 118 of second 2D line segment 110 of second image 106, respectively. FIG. 1B illustrates 3D line segment 122 generated from first image 104 and second image 106, according to some embodiments. 3D line segment 122 is triangulated in a 3D coordinate system from first 2D line segment 108 and second 2D line segment 110; and, because first 2D line segment 108 and second 2D line segment 110 share common corresponding endpoints relative to eave 120, triangulation to 3D line segment 122 represents the same portion of eave 120 (i.e., the entirety of eave 120).

In some instances, the underlying assumption might not hold true—the first 2D line segment and the second 2D line segment may relate to the same real-world line segment, such as eave 120, but the 2D line segments in the associated images may depict different portions of the same real-world line segment. FIG. 1C illustrates a ground-level capture of building structure 152, according to some embodiments. First image 154 illustrates an image of the front of building structure 152 and second image 156 illustrates an image of the corner of building structure 152. First 2D line segment 158 is detected in first image 154 and second 2D line segment 160 is detected in second image 156. In this example, first 2D line segment 158 and second 2D line segment 160 relate to the same real-world line segment (eave 170 of building structure 152), but first image 154 and second image 156 depict different portions of eave 170. As illustrated, first 2D line segment 158 and second 2D line segment 160 relate to eave 170, but depict different portions of eave 170 due to tree 180 which is an occlusion between eave 170 and cameras 174 and 176 that captured first image 154 and second image 156, respectively. End point 164 of first 2D line segment 158 of first image 154 represents a different point of eave 170 than end point 168 of second 2D line segment 160 of second image 156.

FIG. 1D illustrates 3D line segment 172 generated from first image 154 and second image 156 when correspondence of end point 164 is made with endpoint 168. Classic feature matching may drive this result as a false positive match. 3D line segment 172 is triangulated in a 3D coordinate system from first 2D line segment 158 in first image 154 and second 2D line segment 160 in second image 156; however, because of the false positive correspondence, 3D line segment 172 does not accurately represent eave 170, or portion thereof.

It is desirable for methods, storage media, and systems for generating a 3D line segment that represent a real-world line segment that address and alleviate the pitfalls of the discussed prior art method.

BRIEF SUMMARY

The problem of false positives in triangulating a three-dimensional (3D) line segment from two-dimensional (2D) images having 2D lines segments is solved by connecting 3D points of a point cloud that correspond to points along a 2D line segment in a 2D image. Described herein are various methods, storage media, and systems for generating 3D line segments.

A real-world scene can include one or more real-world line segments. One or more 2D images of the real-world scene can include one or more 2D line segments that represent the real-world line segments. Pixel-by-pixel, the 2D line segments in the 2D images are the most accurate projections of the real-world line segments. A 2D image is a 2D plane on which the real-world line segments rest on as 2D line segments.

In some embodiments, one or more 3D line segments can be generated directly from the one or more 2D line segments from at least two 2D images by triangulating the 2D line segments into a 3D coordinate system. This approach only utilizes the 2D positions of the 2D line segments in the 2D images to generate the 3D line segments. As illustrated in FIG. 1D, this approach can result in a 3D line segment that does not accurately represent a real-world line segment. In some embodiments, a 3D point cloud can be generated based on at least two 2D images.

The 3D point cloud represents point depth. In some embodiments, one or more 3D line segments can be generated from 3D points of the 3D point cloud and one or more 2D line segments from at least one 2D image by connecting the 3D points of the 3D point cloud that correspond to points along the 2D line segments. In these embodiments, the 3D line segments are generated by turning point depth of the 3D point cloud into line depth based on the 2D line segments. Turning point depth into line depth based on a 2D line segment in one image is more robust than triangulating a 2D line segment across two or more images. This approach utilizes both the 2D positions of the 2D line segment in the image and the 3D positions of the 3D points of the point cloud to generate the a 3D line segment, and in doing so does not result in the same false positives of the approach illustrated in FIG. 1D.

One aspect of the present disclosure relates to a method for generating a three-dimensional line segment. The method may include receiving a plurality of images. The method may include generating a point cloud based on the plurality of images. The point cloud may include a plurality of 3d points. The method may include detecting a two-dimensional line segment in a first image. The method may include projecting a set of 3d points of the plurality of 3d points as 2d points in the first image. The method may include selecting projected 3d points that are proximate to 2d points along the 2d line segment. The method may include generating a 3d line segment by connecting 3d points of the point cloud represented by the selected projected 3d points.

Another aspect of the present disclosure relates to a non-transient computer-readable storage medium having instructions embodied thereon, the instructions being executable by one or more processors to perform a method for generating a three-dimensional line segment. The method may include receiving a plurality of images. The method may include generating a point cloud based on the plurality of images. The point cloud may include a plurality of 3d points. The method may include detecting a two-dimensional line segment in a first image. The method may include projecting a set of 3d points of the plurality of 3d points as 2d points in the first image. The method may include selecting projected 3d points that are proximate to 2d points along the 2d line segment. The method may include generating a 3d line segment by connecting 3d points of the point cloud represented by the selected projected 3d points.

Yet another aspect of the present disclosure relates to a system configured for generating a three-dimensional line segment. The system may include one or more hardware processors configured by machine-readable instructions. The processor(s) may be configured to receive a plurality of images. The processor(s) may be configured to generate a point cloud based on the plurality of images. The point cloud may include a plurality of 3d points. The processor(s) may be configured to detect a two-dimensional line segment in a first image. The processor(s) may be configured to project a set of 3d points of the plurality of 3d points as 2d points in the first image. The processor(s) may be configured to select projected 3d points that are proximate to 2d points along the 2d line segment. The processor(s) may be configured to generate a 3d line segment by connecting 3d points of the point cloud represented by the selected projected 3d points.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Figure (FIG. 1A illustrates an example ground-level capture of a building structure, according to some embodiments.

In the following description, for the purposes of explanation, numerous specific details are set forth in order to provide a thorough understanding of the present disclosure. It will be appreciated, however, that the present disclosure may be practiced without these specific details. In other instances, well-known structures and devices are shown in block diagram form in order to avoid unnecessarily obscuring the present disclosure.

DETAILED DESCRIPTION

In some embodiments, generating a three-dimensional (3D) line segment from two-dimensional (2D) images uses two 2D images of a 2D line segment to estimate a 3D position of the 2D line segment in a 3D coordinate space thereby generating the 3D line segment. When matching multiple infinite length 2D line segments across two 2D images, it may be difficult to distinguish between correct matches and incorrect matches, for example because infinite length 2D line segments can be partially occluded. To overcome this challenge, additional 2D images (i.e., more than two 2D images) may be used, for example additional 2D images without or with different occluded portions. In some embodiments, matching multiple infinite length 2D line segments across two 2D images can be resource intensive. When matching multiple 2D points across two 2D images, it may not be difficult to distinguish between correct matches and incorrect matches, for example because 2D points cannot be partially occluded. One reason for this may be that the 2D points are expected to be on the same scanline or horizontal plane across the two 2D images. In these embodiments, a point cloud including estimated 3D positions of 2D points across two 2D images can be used to generate a 3D line segment from two 2D images.

Figure 1A:
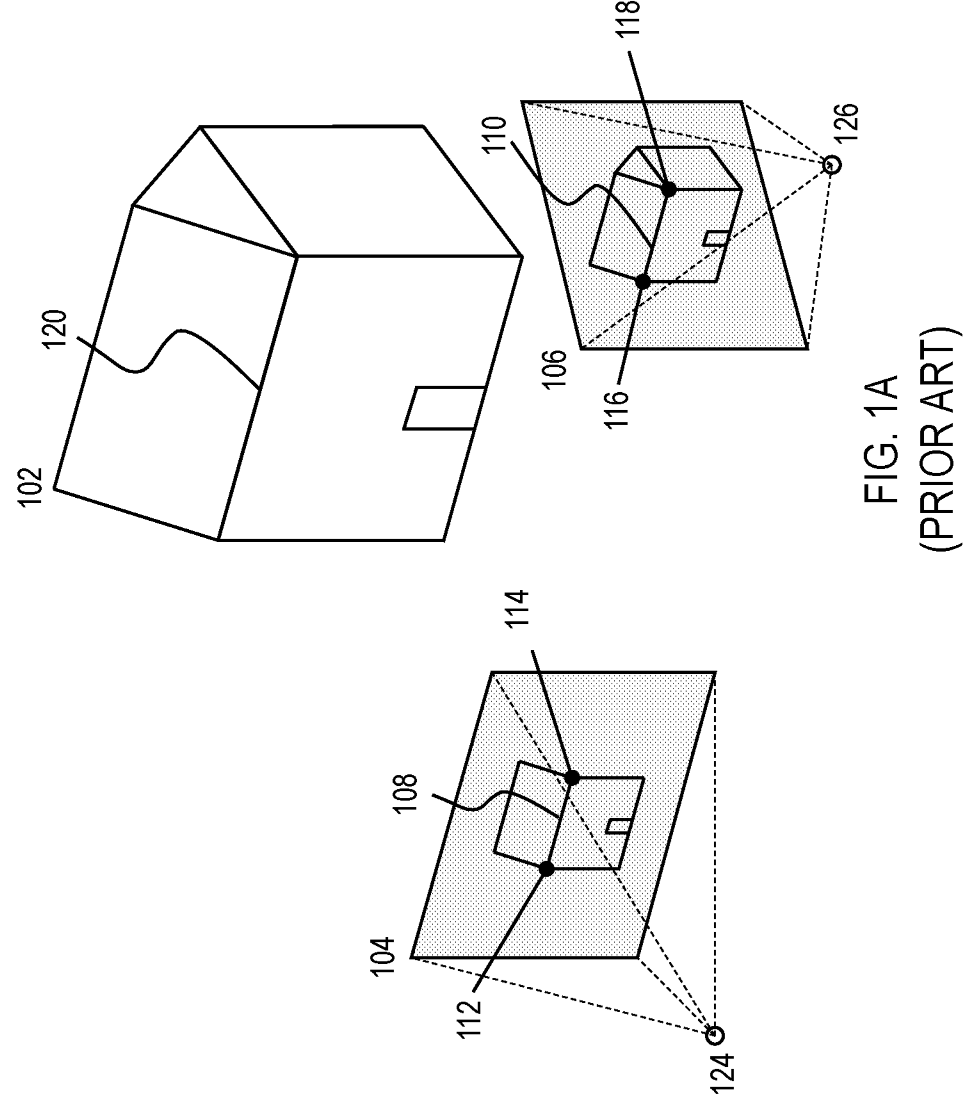
FIG. 1B illustrates a three-dimensional (3D) line segment generated from two-dimensional (2D) images, according to some embodiments.
FIG. 1C illustrates an example ground-level capture of a building structure, according to some embodiments.
FIG. 1D illustrates a 3D line segment generated from 2D images, according to some embodiments.
Figure 1B:
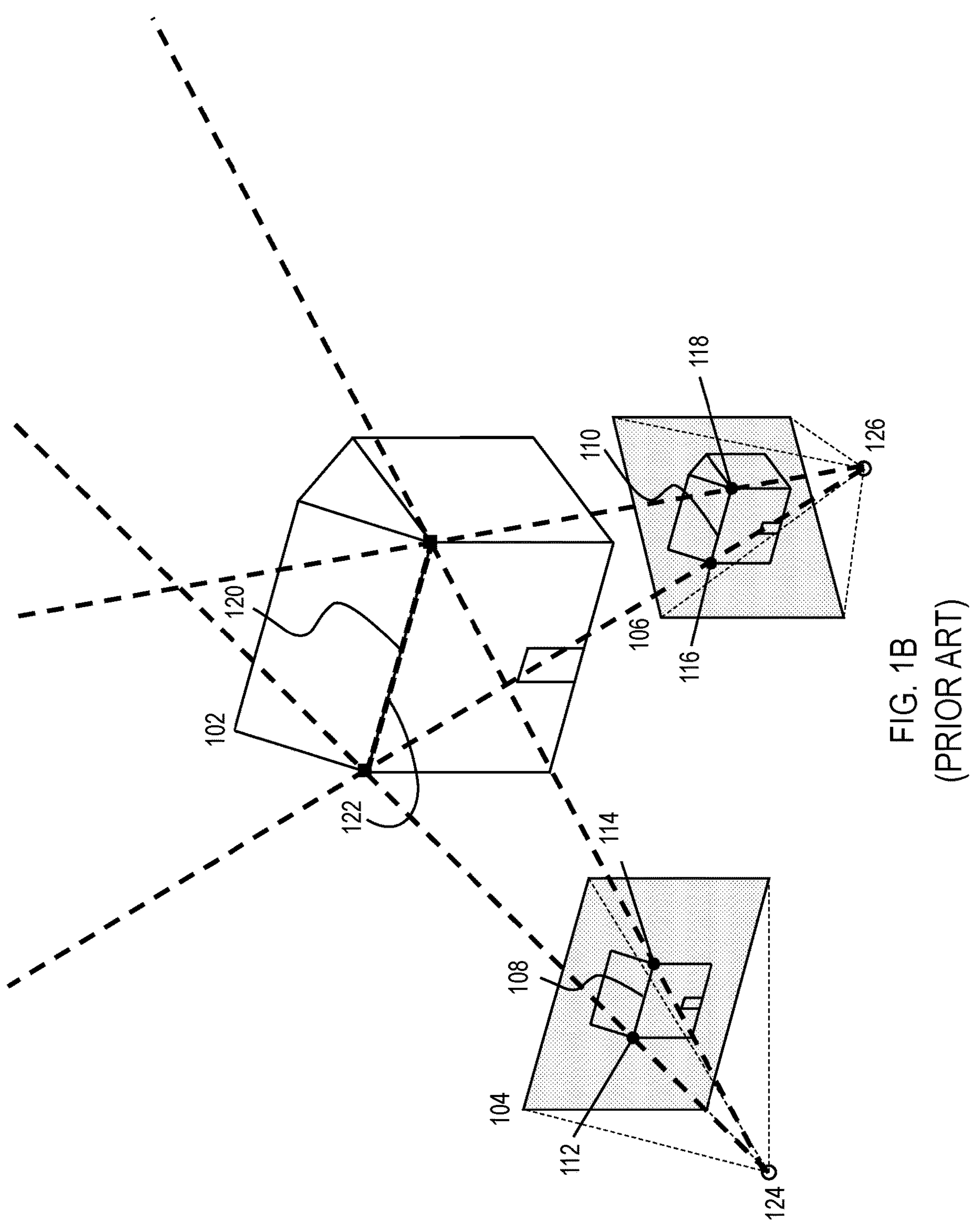
Figure 1C:
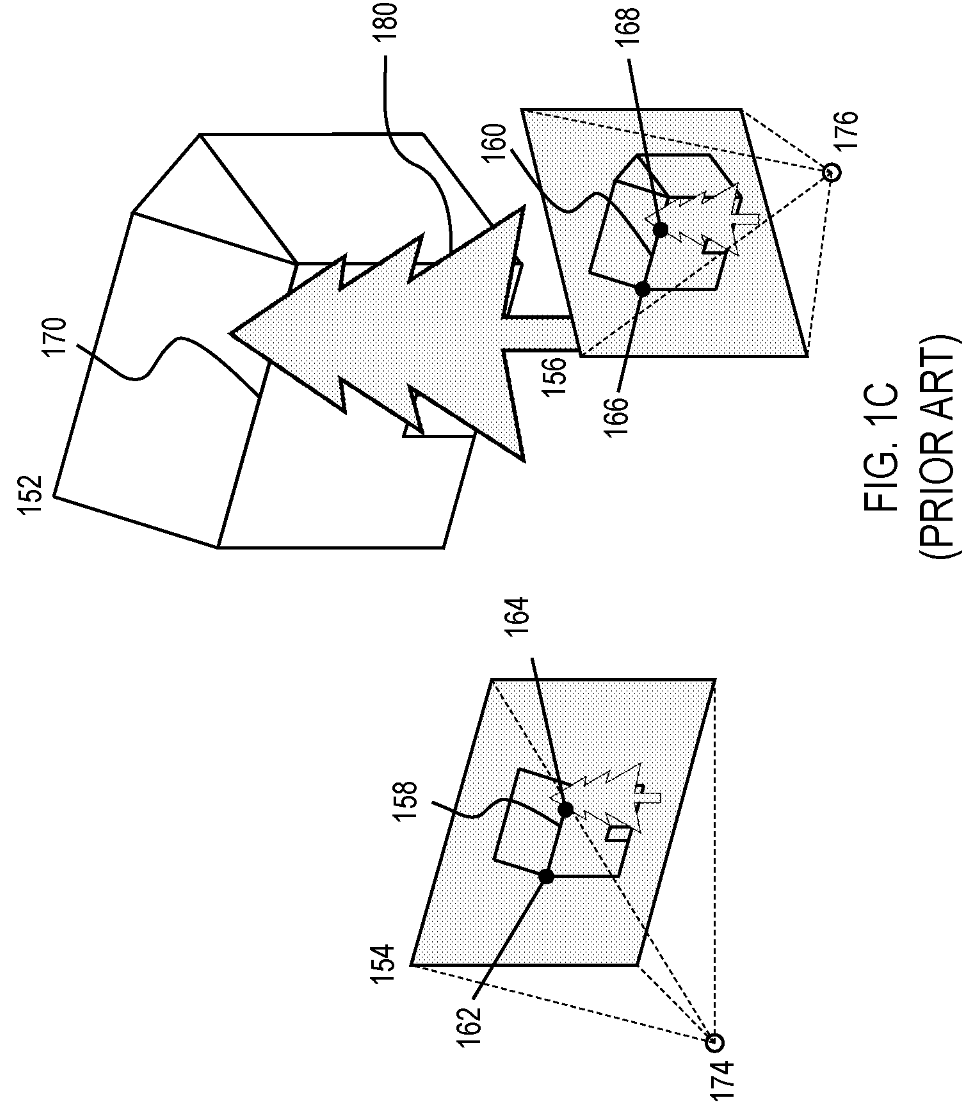
Figure 1D:
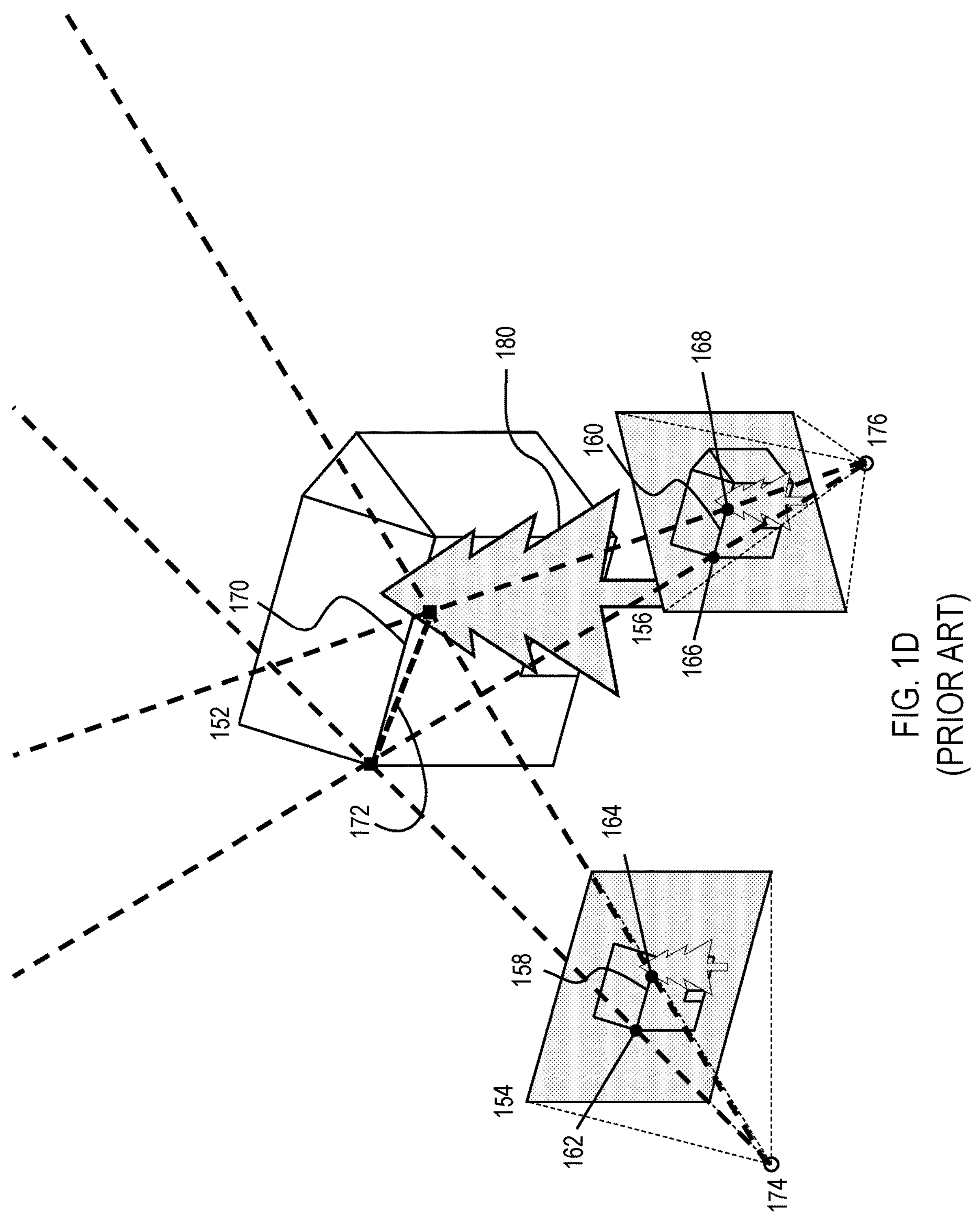
Figure 2:
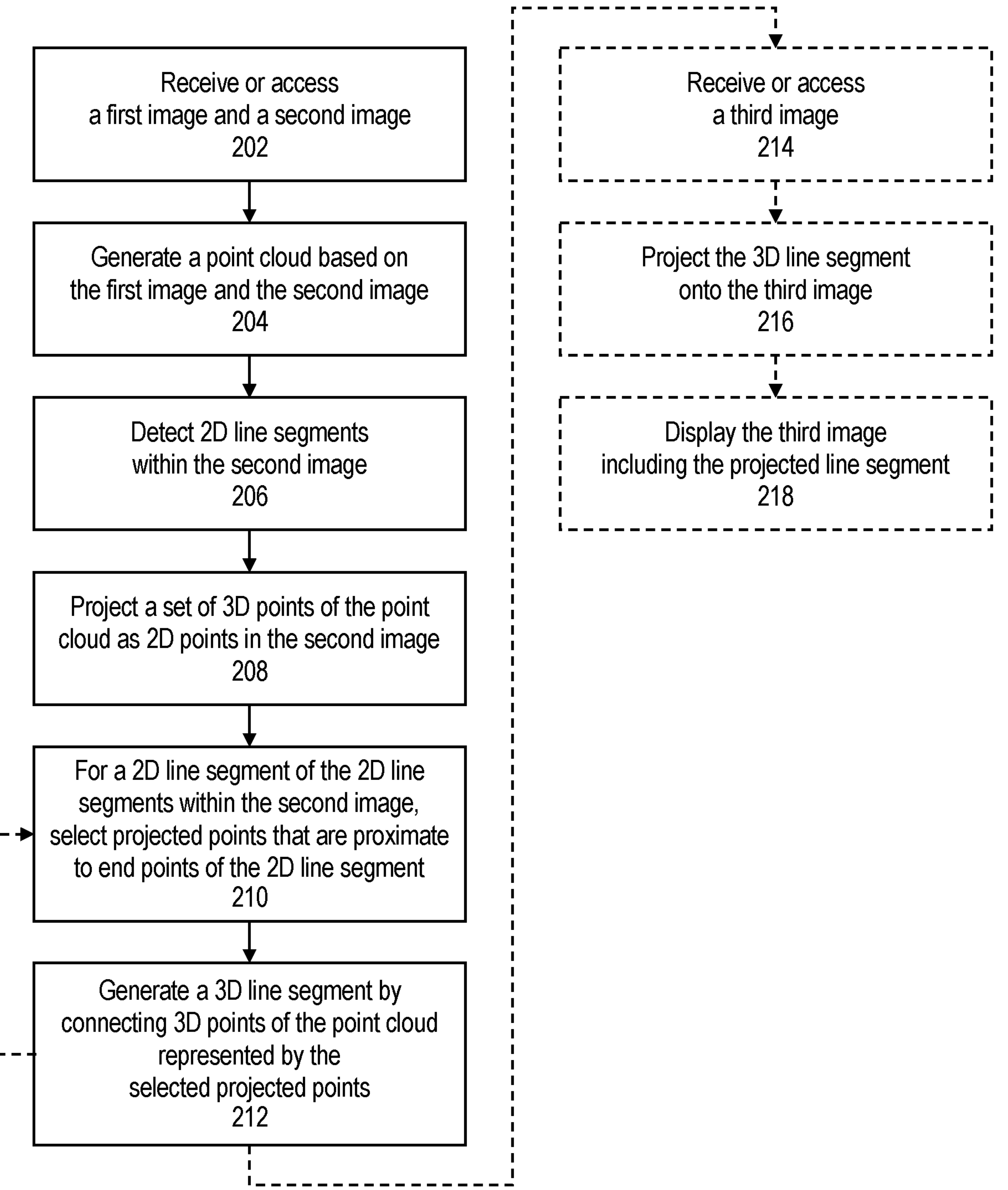
FIG. 2 illustrates a flow diagram for generating a 3D line segment, according to some embodiments.

FIG. 2 illustrates a flow diagram 200 for generating a 3D line segment, according to some embodiments.

At step 2, a first image and a second image are received or accessed. In some embodiments, at step 202, only a second image is received or accessed. A data capture device, such as a smartphone or a tablet computer, can capture the images. Other examples of data capture devices include augmented reality headsets, virtual reality headsets, drones, and aerial platforms such as aircrafts. The images can include ground-level images, aerial images, or both. The aerial images can include top-down orthogonal images, oblique images, or both. The images can be stored in memory or in storage. The images can include information related to camera extrinsics (e.g., pose of the data capture device, including position and orientation, at the time of image capture), camera intrinsics (e.g., camera constant, scale difference, focal length, and principal point), or both. In some embodiments, the images depict a building object or building structure. For example, the images can depict an exterior of a building object or building structure, an interior of a building object or building structure, or both, or portions thereof. In some embodiments, the images are manually captured, for example, by a user of the data capture device. In some embodiments, the images are automatically captured, for example, by the data capture device, based on one or more conditions. The images can include visual data (sometimes referred to as image data) (e.g., color information) and depth data (e.g., depth information). The visual data can be from an image sensor, such as a charge coupled device (CCD) sensor or a complementary metal-oxide semiconductor (CMOS) sensor, embedded within the data capture device. The depth data can be from a depth sensor, such as a LiDAR sensor or time-of-flight sensor, embedded within the data capture device. In some embodiments, the images (i.e., the first image and the second image) are 2D images.

Figure 3:
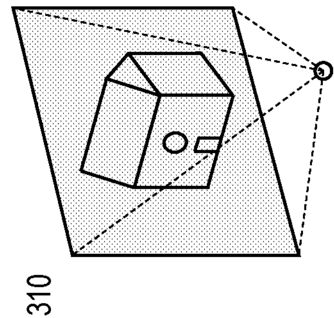
FIG. 3 illustrates example 2D images, according to some embodiments.
Figure 3:
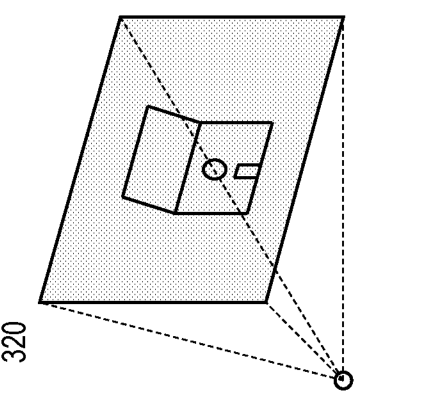

FIG. 3 illustrates example 2D images 310 and 320, according to some embodiments. First image 310 is a corner view of a building structure and illustrates a front façade and a side of the building structure, and second image 320 is a front view of the building structure and illustrates the front façade of the building structure.

Referring back to FIG. 2, at step 204, a point cloud is generated, received, or accessed. In some embodiments, the point cloud is generated based on at least the images (e.g., the first image and the second image). In some embodiments, the point cloud is generated based on at least the first image. In some embodiments, the point cloud is generated based on images other than the second image. The point cloud represents co-visible points across the images in a 3D coordinate space. The point cloud can be generated by utilizing one or more techniques, such as, for example, structure-from-motion (SfM), multi-view stereo (MVS), simultaneous localization and mapping (SLAM), and the like.

In some embodiments, camera poses associated with the images can be received, accessed, or generated. The camera poses describe the position and orientation of the data capture device at the time it captured the images. In some embodiments, the camera poses can be generated based on one or more of the images, the camera extrinsics, and the camera intrinsics. Co-owned U.S. patent application Ser. No. 17/118,370 includes disclosure related to determining and scaling camera poses, as well co-owned U.S. patent application Ser. No. 17/638,773 and co-owned PCT Application No. PCT/US22/14164, the contents of each are incorporated by reference in their entirety. The point cloud can be generated further based on the camera poses associated with the images.

In some embodiments, the images (i.e., the first image and the second image) are segmented to identify a building structure, or portion thereof. In these embodiments, the point cloud can be generated based on the segmented images (i.e., the segmented first image and the segmented second image). Co-owned U.S. patent application Ser. No. 17/163,043 includes disclosure related to segmenting images into classifications, the contents of which are incorporated by reference in their entirety.

In some embodiments, features in the images are detected or extracted. In some embodiments, first features are detected in the first image and second features are detected in the second image. In some embodiments, first features are detected in the segmented first image and second features are detected in the segmented second image. In some embodiments, first features are detected in the first image and first features that are within the segmented first image are selected, and, in some embodiments, first features that are not within the segmented first image are discarded or disregarded. In some embodiments, second features are detected in the second image and second features that are within the segmented second image are selected, and, in some embodiments, second features that are not within the segmented second image are discarded is disregarded.

In some embodiments, the features can be detected utilizing visual appearance-based feature detection techniques, classifier-based feature detection techniques, or some combination thereof. Examples of visual appearance-based feature detection techniques include, for example, Harris corner detection, scale-invariant feature transform (SIFT), feature from accelerated segment test (FAST), speeded up robust features (SURF), binary robust independent elementary features (BRIEF), oriented FAST and rotated BRIEF (ORB), SuperPoint.

In some embodiments, the features are matched across the images. That is, the first features and the second features are matched across the first image and the second image. In some embodiments, the features can be matched utilizing visual appearance-based feature matching techniques, classifier-based feature matching techniques, or some combination thereof. Examples of visual appearance-based feature matching techniques include Brute-Force Matcher, Fast Library for Approximate Nearest Neighbors (FLANN), and SuperGlue. The matched features represent features that are in both the first image and the second image.

In some embodiments, a 3D position of each matched feature is estimated. In some embodiments, the 3D position of each matched feature is estimated among reprojected triangulations of the matched feature across the images (e.g., the first image and the second image). In some embodiments, a 3D position of a matched feature can be at an intersection of a first ray from an optical center of a data capture device at a first pose through the matched feature in the first image and a second ray from an optical center of a data capture device at a second pose through the matched feature in the second image.

Figure 4:
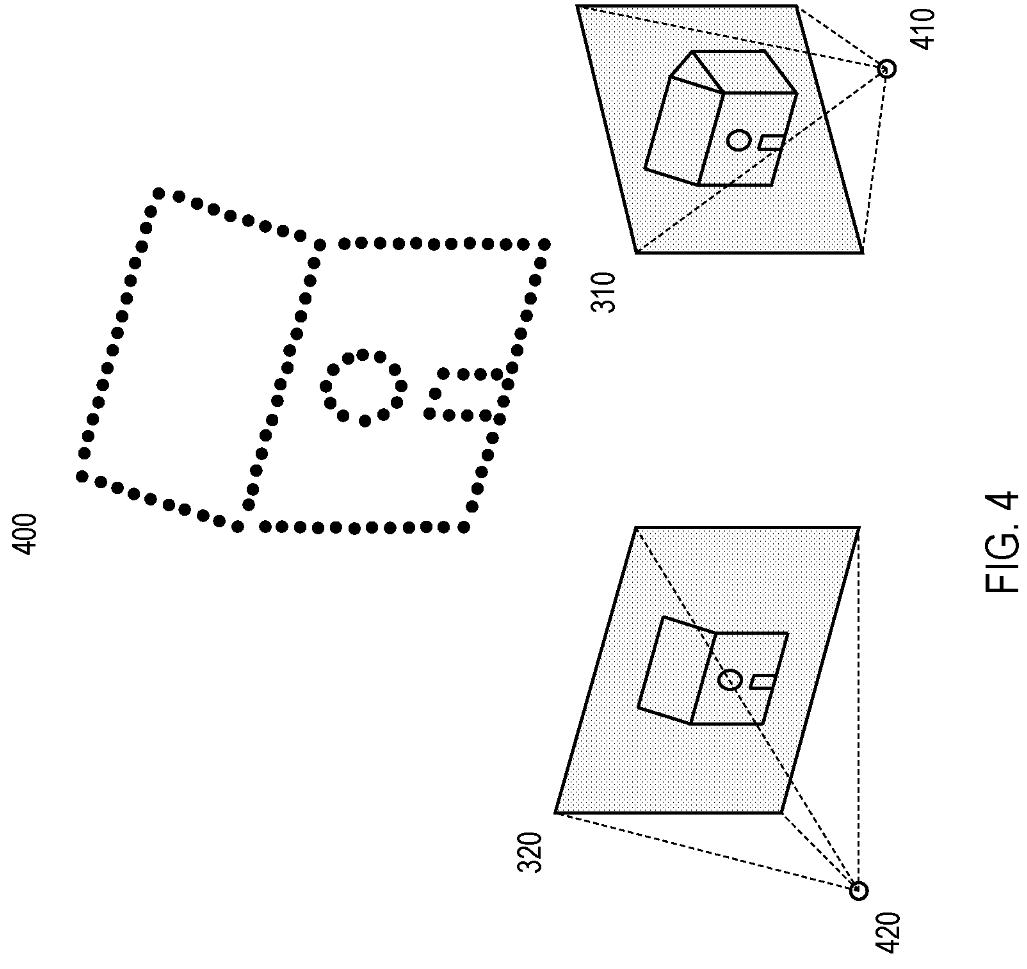
FIG. 4 illustrates an example point cloud, according to some embodiments.

FIG. 4 illustrates a point cloud 400, according to some embodiments. The point cloud 400 is generated based on the first image 310 and the second image 320. The point cloud 400 represents co-visible points across the first image 310 and the second image 320 in a 3D coordinate space. As described herein with reference to FIG. 3, both the first image 310 and the second image 320 illustrate the front façade of the building structure. The point cloud 400 includes 3D points that are associated with the front façade of the building structure illustrated in both the first image 310 and the second image 320. The point cloud 400 can be generated further based on a first camera pose 410 associated with the first image 310 and a second camera pose 420 associated with the second image 320.

Referring back to FIG. 2, at step 206, one or more 2D line segments within the second image are detected or derived. The 2D line segments can be detected utilizing one or more techniques, such as, for example, Hough transformations, Line Segment Detector (LSD), Edge Drawing Lines (EDLines), and the like. In some embodiments, the 2D line segments can be derived from 2D points in the second image utilizing one or more techniques, such as, for example, Hough transformations, edge detection, visual appearance-based feature detection, classifier-based feature detection, contour detection, curve detection, random sample consensus (RANSAC), and the like. In some embodiments, a 2D line segment is any straight gradient within the second image that is of at least a threshold length. The threshold length can be in units of pixels. Examples of threshold lengths include 20 pixels, 25 pixels, 30 pixels, and the like. The threshold length may be a dynamic value or a static value. In the embodiments where the threshold length is a dynamic value, the threshold length may be calculated based on lengths of the 2D line segments within the second image. The threshold length may be a mean or a median of the 2D line segments within the second image. In embodiments where the threshold length is a static value, the threshold length may be calculated based on empirical values, for example of lengths of 2D line segments of images of previous captures.

In some embodiments, 2D line segments are detected within the segmented second image. In some embodiments, 2D line segments are detected within the second image and 2D line segments that are within the segmented second image are selected, and, in some embodiments, 2D line segments that are not within the segmented second image are discarded or disregarded.

Figure 5:
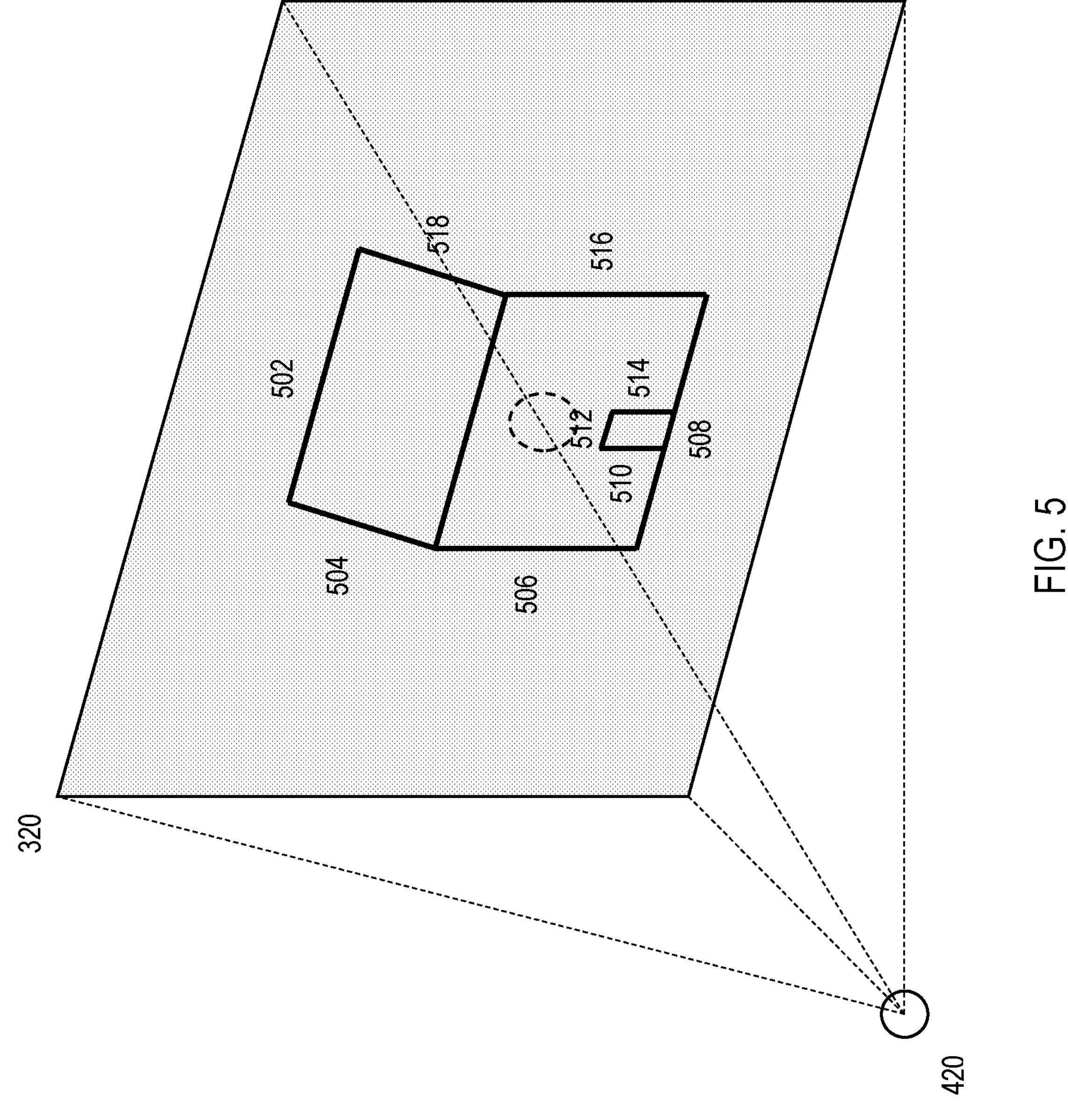
FIG. 5 illustrates example 2D line segments detected within an example image, according to some embodiments.

FIG. 5 illustrates 2D line segments 502-518 detected within the second image 320, according to some embodiments.

Figure 6C:
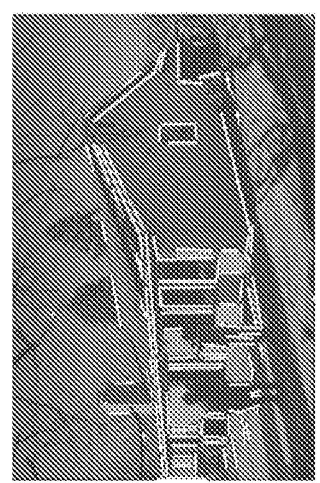
FIG. 6C illustrates 2D line segments within an example image that are within a segmentation mask, according to some embodiments.
Figure 6B:
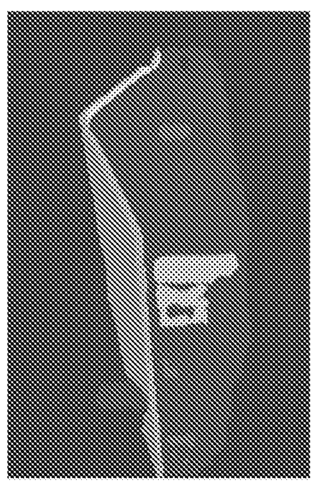
FIG. 6B illustrates a segmentation mask, according to some embodiments.
Figure 6A:
FIG. 6A illustrates 2D line segments detected within an example image, according to some embodiments.

FIG. 6A illustrates line segments detected within an image, according to some embodiments. The image of FIG. 6A (i.e., the image without the line segments) is segmented to identify a building structure. FIG. 6B illustrates a segmentation mask of the building structure of the image of FIG. 6A, according to some embodiments. The detected line segments within the image of FIG. 6A that are not within the segmentation mask of FIG. 6B are removed. FIG. 6C illustrates line segments detected within the image of FIG. 6A that are within the segmentation mask of FIG. 6B, according to some embodiments.

Referring back to FIG. 2, at step 208, a set of 3D points of the point cloud are projected as 2D points in the second image. In some embodiments, the set of 3D points of the point cloud are projected onto the second image based on a second camera pose associated with the second image. In some embodiments, the set of 3D points of the point cloud can be projected onto the segmented second image. In some embodiments, the set of 3D points of the point cloud can be projected onto the second image and projected 3D points that are within the segmented second image can be selected, and, in some embodiments, projected 3D points that are not within the segmented image can be discarded or disregarded. In some embodiments, one or more heuristics can be used to determine whether and which 3D points of the point cloud to project onto the second image.

In some embodiments, each 3D point of the point cloud can have an associated visibility direction and the second camera can have an associated visibility direction. In some embodiments, a visibility direction may be expressed as a normalized vector. In some embodiments, the set of 3D points of the point cloud includes 3D points whose associated visibility direction corresponds to a visibility direction of the second camera. For example, a 3D point is projected onto the second image if the visibility direction of the 3D point corresponds to the visibility direction of the second camera, and, in some embodiments, the 3D point is not projected if the visibility direction of the 3D point does not correspond to the visibility direction of the second camera. In some embodiments, the visibility direction of a 3D point corresponds to the visibility direction of the second camera when the visibility direction of the 3D point is less than orthogonal to the visibility direction of the first camera.

In some embodiments, a visibility direction of a camera is based on a pose of the camera. In some examples, the visibility direction of the camera is the orientation of the camera. In some examples, the visibility direction of the camera is calculated by casting a ray from the location of the camera (e.g., an optical center of the camera) through a center of an image captured by the camera. In some embodiments, the visibility direction of a 2D point of an image captured by the camera is calculated by casting a ray from the location of the camera (e.g., an optical center of the camera) through the 2D point of the image captured by the camera.

In some embodiments, a visibility direction of a 3D point of the point cloud may be based on visibility directions of cameras that were used to triangulate/generate the 3D point. In some examples, the visibility direction of the 3D point may be calculated based on a mean or a median of visibility directions of cameras that were used to triangulate/generate the 3D point. In some examples, the visibility direction of the 3D point may be calculated based on a mean or a median of normalized differences between the 3D point and poses of cameras that were used to triangulate/generate the 3D point.

In some embodiments, the set of 3D points of the point cloud includes 3D points of the point cloud that are less than a threshold distance (e.g., Euclidean distance) from a location of the second camera (e.g., an optical center of the second camera) associated with the second image, for example as described by the second camera pose. For example, 3D points that are less than a threshold distance from a location of a second camera are projected onto the second image, and, in some embodiments, 3D points that are greater than the threshold distance from the location of the second camera are not projected onto the second image. The threshold distance may be a dynamic value or a static value. In the embodiments where the threshold distance is a dynamic value, the threshold distance may be calculated based on distances between the 3D points of the point cloud and the location of the second camera. The threshold distance may be a mean or a median of the distances between the 3D points of the point cloud and the location of the second camera. In the embodiments where the threshold distance is a static value, the threshold distance may be calculated based on empirical values, for example of distances between 3D points of point clouds and locations of cameras of previous captures.

In some embodiments, the 3D points of the point cloud can be projected onto the second image based on scene understanding. In some embodiments, each 3D point of the point cloud may include metadata describing the classifications of the 3D point and each 2D point of the second image may be include metadata describing the classifications of the 2D point. Examples of classifications include façade face (e.g., front, back, left, right), building structure feature (e.g., eaves, ridges, rakes, posts, fascia, soffits, windows, doors, etc.), and the like. In some embodiments, 3D points of the point cloud can be projected onto the second image if the classifications of the 3D points matches to the classifications of the 2D points of the second image. In some embodiments, all 3D points of the point cloud can be projected onto the second image. If the classification of a projected 3D point matches to the classification of a 2D point of the image that the projected 3D point is on, the projected 3D point may persist (e.g., may be a part of the set of 3D points). If the classification of the projected 3D point does not match to the classification of the 2D point of the image that the projected 3D point is on, the projected 3D point may not persist (e.g., may not be a part of the set of 3D points).

Figure 7:
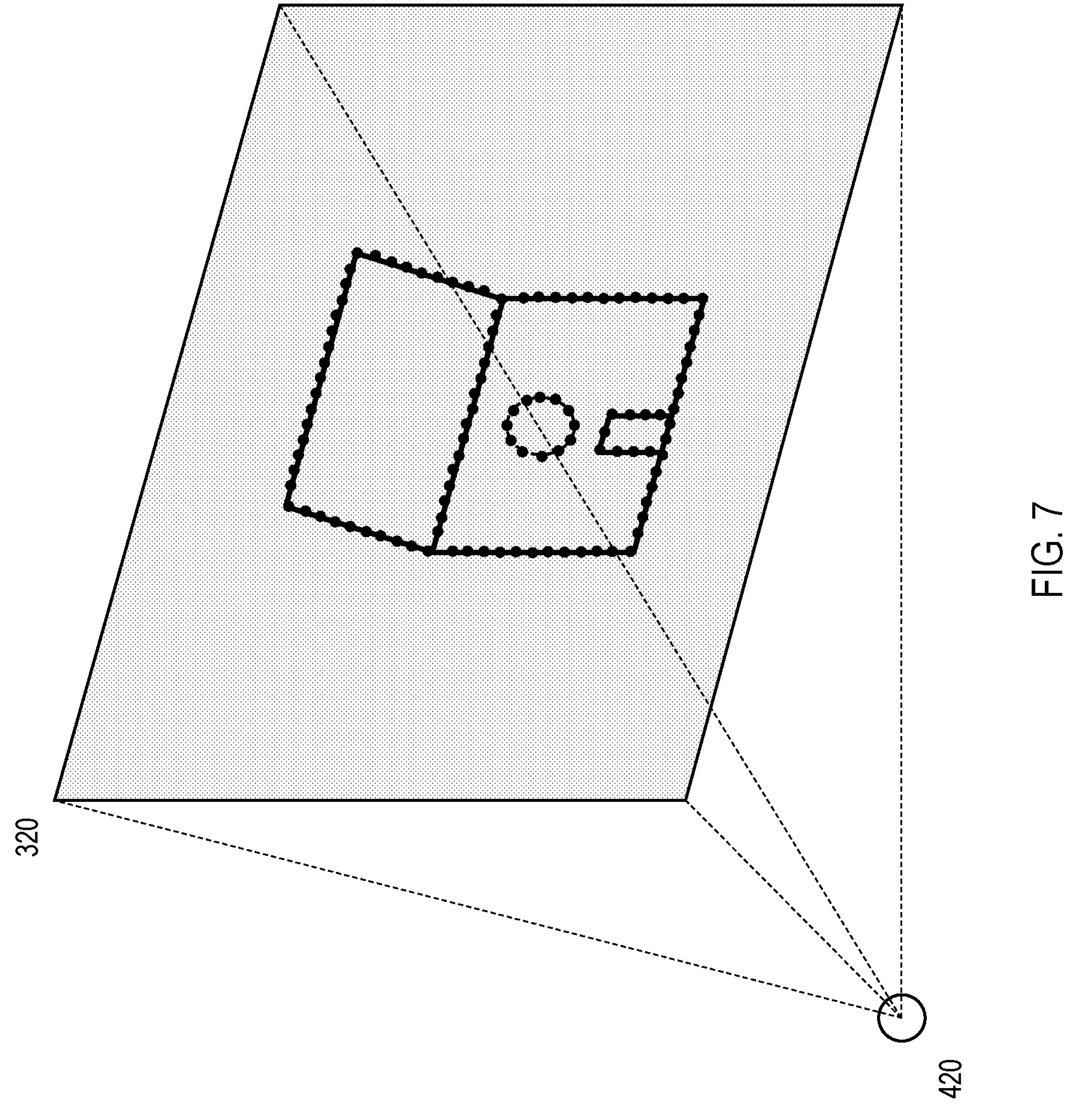
FIG. 7 illustrates 3D points of a point cloud projected onto an example image, according to some embodiments.

FIG. 7 illustrates a set of 3D points of the point cloud 400 projected as 2D points in the second image 320, according to some embodiments. In some embodiments, the set of 3D points of the point cloud 400 can be projected as 2D points in the second image 320 based on the second camera pose 420.

Referring back to FIG. 2, at step 210, for a 2D line segment of the one or more 2D line segments within the second image, projected 3D points that are proximate to points along the 2D line segment are selected. In some embodiments, projected 3D points that are proximate to end points of the 2D line segment are selected. The end points of the 2D line segment are 2D points within the second image that define the 2D line segment. In some embodiments, of all the projected 3D points, the projected 3D points that are within a predetermined threshold distance of a point along the 2D line segment are considered to be proximate to the point along the 2D line segment. In these embodiments, projected 3D points that are within the predetermined threshold distance of the point along the 2D line segment are selected. In some embodiments, if there is more than one projected 3D point within the predetermined threshold distance of the 2D point along the 2D line segment, a mean or a median distance of the distances between the projected 3D points within the predetermined threshold distance and the 2D point along the 2D line segment is calculated. In some examples, the projected 3D point that is closest to the mean or the median distance from the 2D point along the 2D line segment is selected. In some examples, a new 3D point in the point cloud is generated based on the mean or the median distance. The predetermined threshold distance can be in units of pixels. The predetermined threshold distance can be relative to a 2D coordinate system of the second image (e.g., image place of the second image) or a plane of a 3D coordinate system (e.g., image plane of the second image). Examples of predetermined threshold distances include 5 pixels, 10 pixels, 15 pixels, and the like. In some embodiments, of all the projected 3D points, the projected 3D point that is closest to (i.e., a minimum distance away from) a point along the 2D line segment is considered to be proximate to the point along the 2D line segments.

Figure 8:
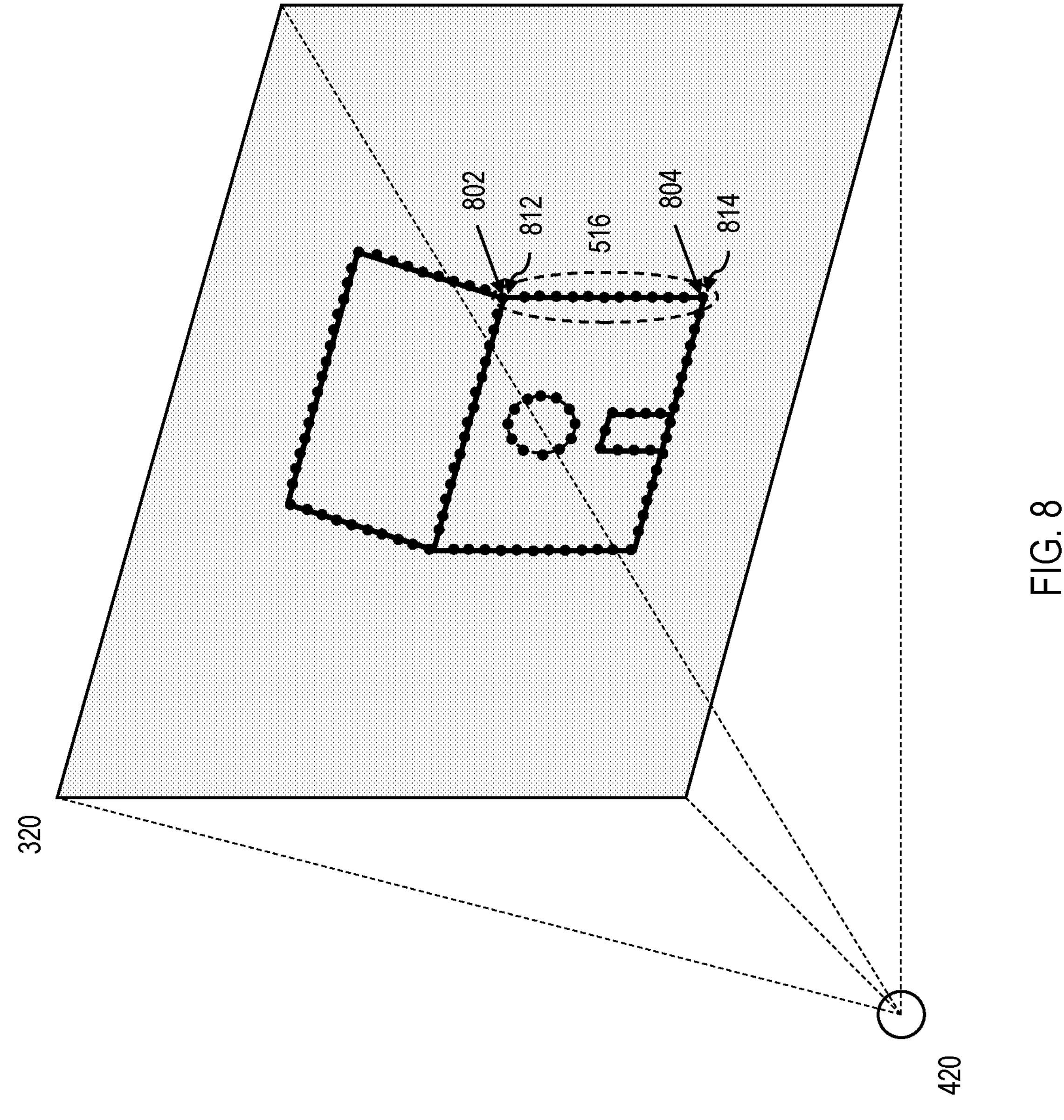
FIG. 8 illustrates projected points proximate to points along a 2D line segment of an example image, according to some embodiments.

FIG. 8 illustrates projected points 802 and 804 proximate to points 812 and 814 along the 2D line segment 516 within the second image 320, according to some embodiments.

Referring back to FIG. 2, at step 212, a 3D line segment is generated by connecting 3D points of the point cloud represented by the selected projected points. In some embodiments, at step 212, a 3D line segment is generated by connecting the new 3D points of the point cloud. The 3D line segment can be a part of a line cloud. A line cloud is a set of 3D line segments in a 3D coordinate system. In some embodiments, the line cloud and the point cloud are in a common 3D coordinate system. In some embodiments, the point cloud and the line cloud can be represented as separate from one another, but in the same 3D coordinate space. In some embodiments, the line cloud and the point cloud are in separate 3D coordinate systems.

Figure 9:
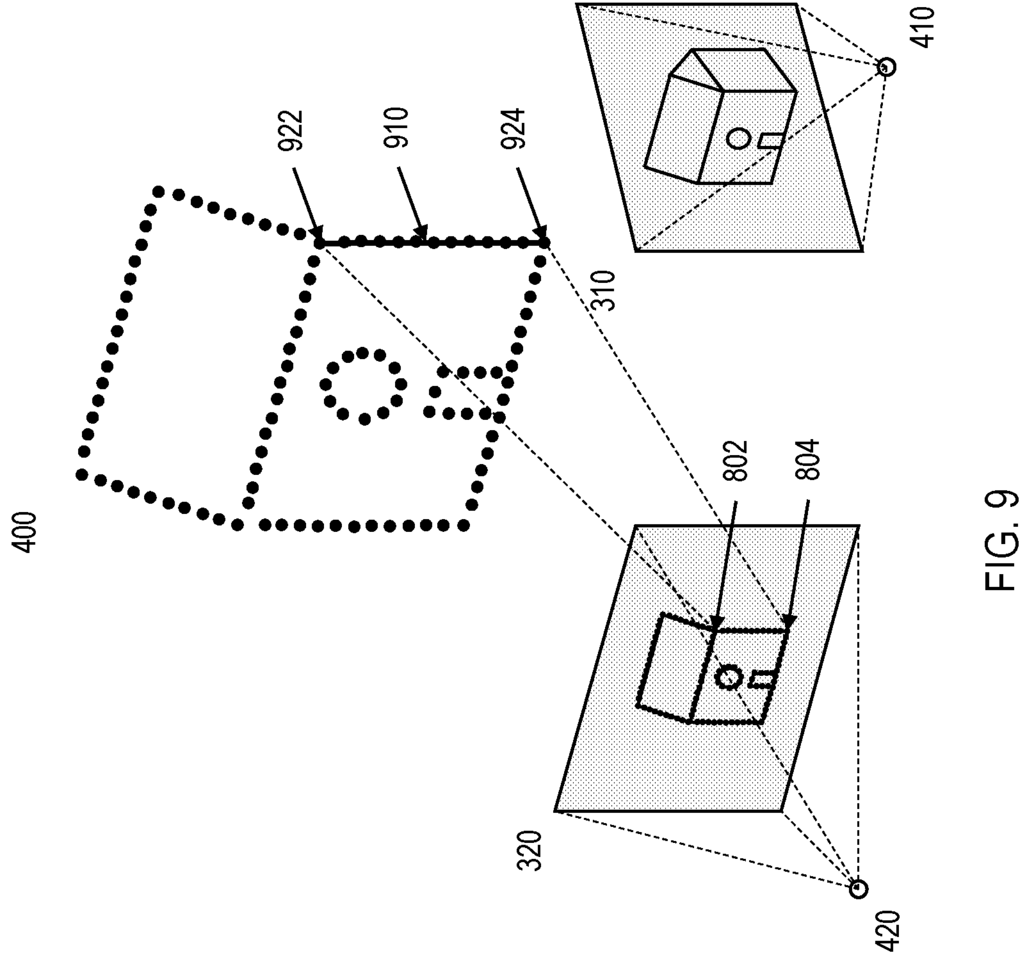
FIG. 9 illustrates a 3D line segment that is generated by connecting 3D points of a point cloud represented by selected projected points, according to some embodiments.

FIG. 9 illustrates 3D line segment 910 that is generated by connecting 3D points 922 and 924 of the point cloud 900 represented by selected projected points 802 and 804, according to some embodiments.

Referring back to FIG. 2, in some embodiments, steps 210 and 212 can be repeated until a 3D line segment is generated for each 2D line segment in the second image.

In some embodiments, the flow diagram 200 can include steps 214 through 218. In some embodiments, steps 214 through 218 are optional. At step 214, a third image is received or accessed. At step 216, the 3D line segment is projected as a 2D line segment onto the third image. In some embodiments, the 3D line segment is projected onto the third image as a 2D line segment based on a third camera pose associated with the third image. In some embodiments, the third image can be segmented to identify a building structure, or portion thereof. In these embodiments, the 3D line segment can be projected onto the segmented third image as a 2D line segment. In some embodiments, the 3D line segment can be projected onto the third image as a 2D line segment and portions of the projected 3D line segment that are within the segmented third image can be selected (e.g., for display at step 218), and, in some embodiments, portions of the projected 3D line segment that are not within the segmented third image can be discarded or disregarded. In some embodiments, one or more heuristics can be used to determine whether and which portions of the 3D line segment to project onto the third image as a 2D line segment.

In some embodiments, a 3D line segment can have an associated visibility direction. In some embodiments, the visibility direction is based on the 3D points of the point cloud that are along the 3D line segment, 3D points of the point cloud that are connected to generate the 3D line segment, 3D end points of the 3D line segment, or a combination thereof. In some embodiments, a 3D line segment, or portion thereof, is projected onto the third image as a 2D line segment if the associated visibility direction corresponds to the third camera pose, and, in some embodiments, the 3D line segment, or portion thereof, is not projected onto the third image as a 2D line segment if the associated visibility direction does not correspond to the third camera pose.

In some embodiments, the 3D line segments, or portions thereof, can be projected onto the third image as a 2D line segment based on distances between the 3D line segments (e.g., 3D points of the point cloud that are along the 3D line segments, 3D points of the point cloud that are connected to generated the 3D line segments, 3D end points of the 3D line segments, or a combination thereof) and the third camera associated with the third image, for example as described by the third camera pose. For example, 3D line segments that are less than a threshold distance (e.g., Euclidean distance of 3D points of the point cloud that are along the 3D line segments, 3D points of the point cloud that are connected to generate the 3D line segments, 3D end points of the 3D line segments, or a combination thereof) from a location (e.g., 3D position) of a third camera are projected onto the third image, and, in some embodiments, 3D line segments that are greater than the threshold distance from the location of the third camera are not projected onto the third image.

In some embodiments, the 3D line segments can be projected onto the third image based on scene understanding. For example, if the third image is a corner view of a building structure and illustrates a front façade and a side of the building structure, then 3D line segments that would be visible from the corner view, that are associated with the front façade and the side, or both, can be projected onto the third image.

In some embodiments, one or more 2D line segments within the third image are detected or derived, and projected 3D line segments that align, or substantially align, with the detected 2D line segments are selected (e.g., for display at step 218), and, in some embodiments, projected 3D line segments that do not align, or substantially align, with the detected 2D line segments are discarded or disregarded.

At step 218, the third image including the projected line segment is displayed. In some embodiments, the projected line segment is displayed as an overlay on the third image. In some embodiments, the data capture device displays the projected line segment. In some embodiments, an external device displays the projected line segment. The data capture device or the external device can display the projected line segment on a display. The display can be a liquid crystal display (LCD) (e.g., thin-film-transistor (TFT) LCD, in-panel-switching (IPS) LCD, capacitive touchscreen LCD, etc.), light-emitting-diode (LED) (e.g., organic LED (OLED), active matrix OLED (AMOLED), Super AMOLED, etc.), and the like. In some embodiments, displaying the third image including the projected line segment can convey a sense of building structure understanding to a user of the data capture device.

In some embodiments, the 3D line segment is projected onto the second image. In some embodiments, the 3D line segment is projected onto the second image based on the second camera pose associated with the second image. In some embodiments, the 3D line segment can be projected onto the segmented second image. In some embodiments, the second image including the projected line segment is displayed. In some embodiments, the projected line segment is displayed as an overlay on the second image.

Figure 10:
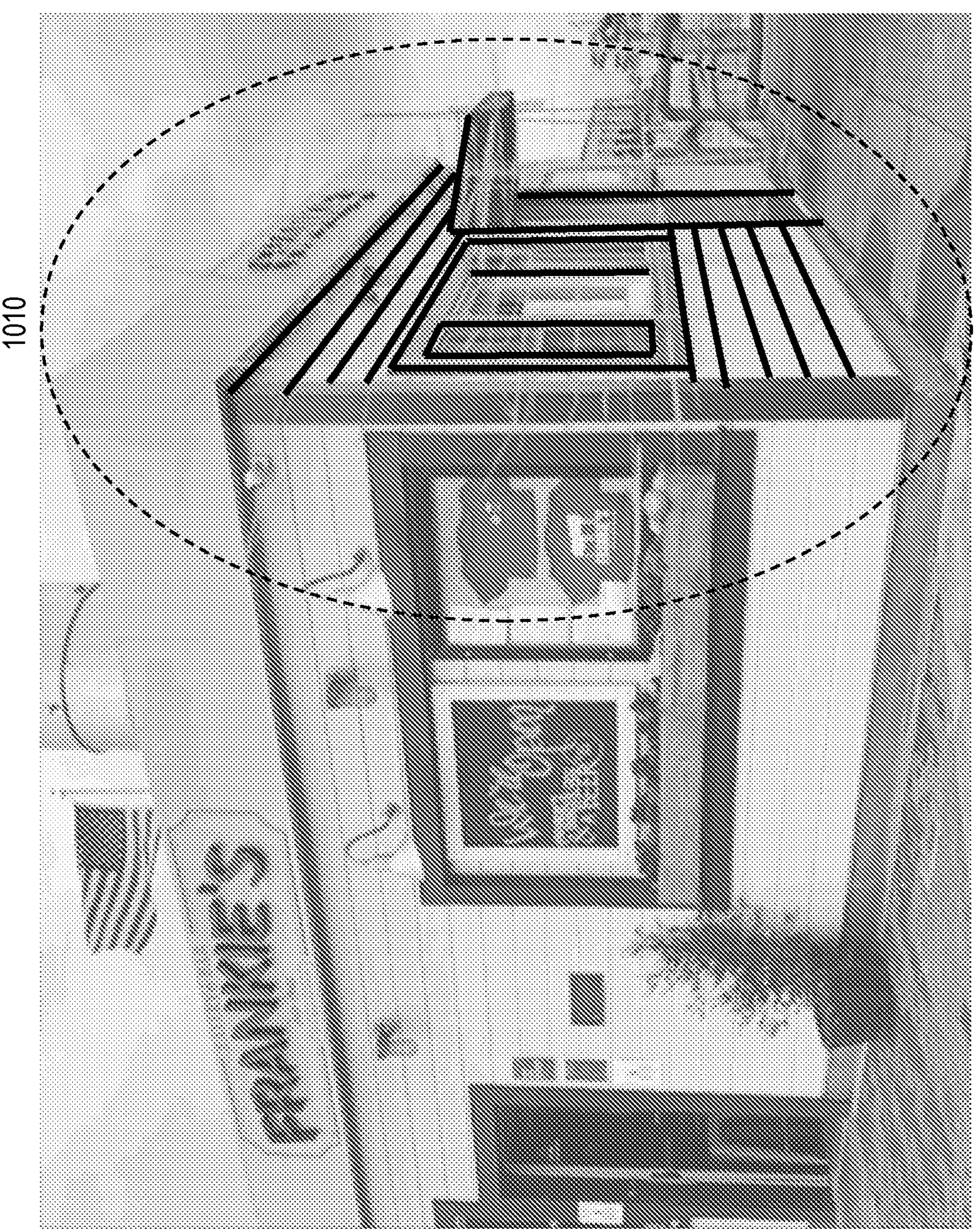
FIG. 10 illustrates an example image including projected line segments, according to some embodiments.

FIG. 10 illustrates an image 1000 including projected line segments in region 1010, according to some embodiments. The projected line segments represent 3D line segments that are generated from two images per the disclosure related to FIG. 2, for example steps 202 through 212, and the image 1000 including the projected line segments in the region 1010 is displayed per the disclosure related to FIG. 2, for example steps 214 through 218.

Figure 11:
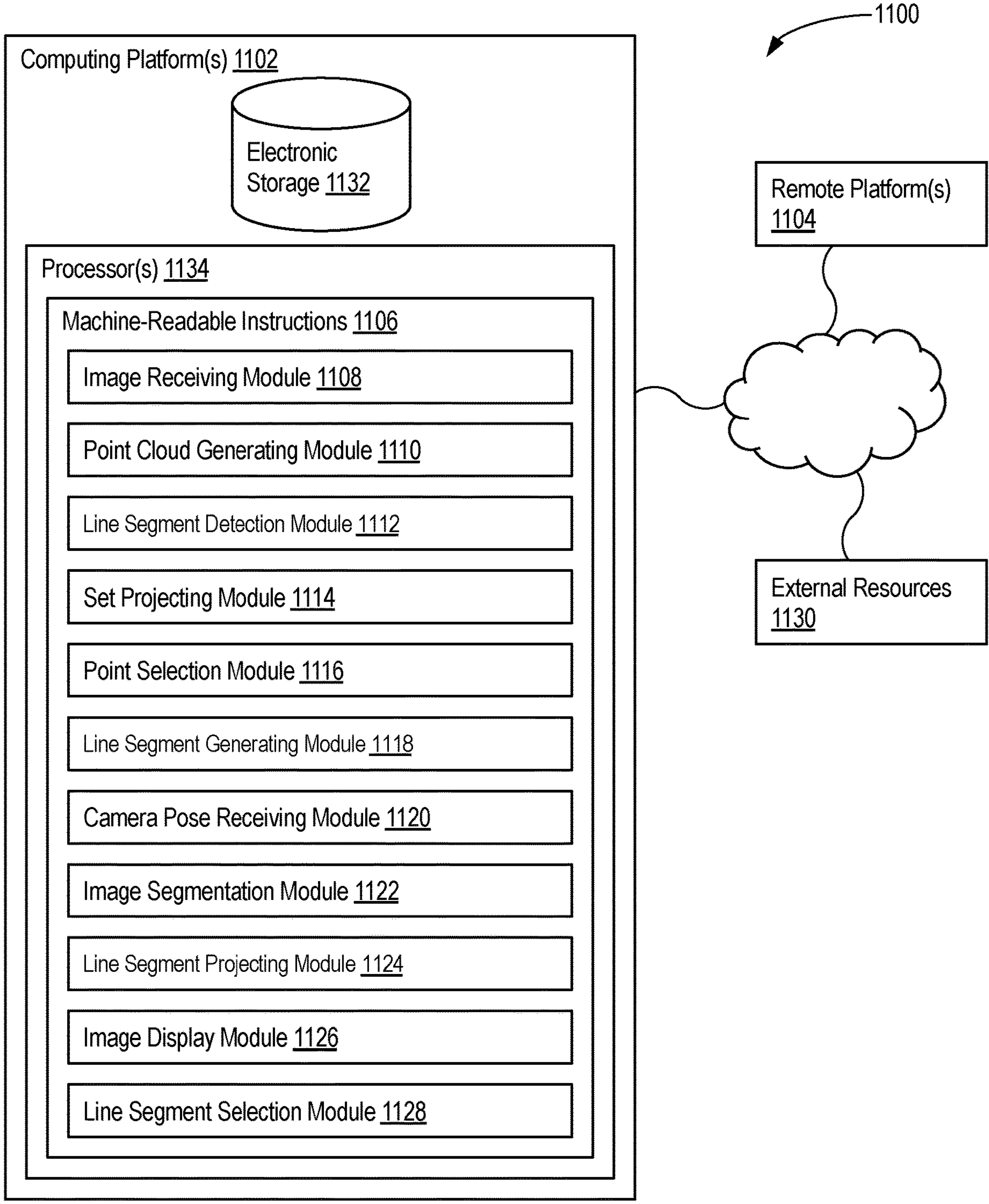
FIG. 11 illustrates a system configured for generating a three-dimensional line segment, according to some embodiments.

FIG. 11 illustrates a system 1100 configured for generating a three-dimensional line segment, in accordance with one or more implementations. In some implementations, system 1100 may include one or more computing platforms 1102. Computing platform(s) 1102 may be configured to communicate with one or more remote platforms 1104 according to a client/server architecture, a peer-to-peer architecture, and/or other architectures. Remote platform(s) 1104 may be configured to communicate with other remote platforms via computing platform(s) 1102 and/or according to a client/server architecture, a peer-to-peer architecture, and/or other architectures. Users may access system 1100 via remote platform(s) 1104.

Computing platform(s) 1102 may be configured by machine-readable instructions 1106. Machine-readable instructions 1106 may include one or more instruction modules. The instruction modules may include computer program modules. The instruction modules may include one or more of image receiving module 1108, point cloud generating module 1110, line segment detection module 1112, set projecting module 1114, point selection module 1116, line segment generating module 1118, camera pose receiving module 1120, image segmentation module 1122, line segment projecting module 1124, image display module 1126, line segment selection module 1128, and/or other instruction modules.

Image receiving module 1108 may be configured to receive a plurality of images. The plurality of images may include at least one of visual data or depth data. By way of non-limiting example, the plurality of images may be captured by one or more of a smartphone, a tablet computer, an augmented reality headset, a virtual reality headset, a drone, and an aerial platform. Each of the plurality of images may depict a building object. Segmenting the plurality of images may include identifying a building structure.

Image receiving module 1108 may be configured to receive a second image. Displaying the second image may include displaying the selected 3d line segment.

Point cloud generating module 1110 may be configured to generate a point cloud based on the plurality of images. Generating the point cloud may be further based on the plurality of camera poses. Generating the point cloud may be further based on the plurality of segmented images. Generating the point cloud may include detecting features in the plurality of images. Generating the point cloud may include matching the detected features across the plurality of images.

Generating the point cloud may include estimating 3d positions of the matched features. Detecting the features in the plurality of images may be based on at least one of visual appearance-based feature detection techniques or classifier-based feature detection techniques. Matching the features across the plurality of images may be based on at least one of visual appearance-based feature matching techniques or classifier-based feature matching techniques. The point cloud may include a plurality of 3d points. The plurality of 3d points may include associated visibility directions. Projecting the set of 3d point may include comparing the visibility directions of the plurality of 3d points to the visibility direction of the first camera.

Projecting the set of 3d point may include projecting a 3d point of the plurality of 3d points responsive to a visibility direction of the 3d point corresponding to the visibility direction of the first camera. The visibility direction of the 3d point may correspond the visibility direction of the first camera when the visibility direction of the 3d point is less than orthogonal to the visibility direction of the first camera.

A visibility direction of a 3d point of the plurality of 3d points may be based in visibility directions of cameras associated with images of the plurality of images that were used to generate the 3d point of the plurality of 3d points. The visibility direction of the 3d point of the plurality of 3d points may be calculated based on a mean of the visibility directions of the cameras associated with the images of the plurality of images that were used to generate the 3d point of the plurality of 3d points. The visibility direction of the 3d point of the plurality of 3d points may be calculated based on a mean of normalized differences between the 3d point and poses associated with the images of the plurality of images that were used to generate the 3d point of the plurality of 3d points.

Line segment detection module 1112 may be configured to detect a two-dimensional line segment in a first image. The first image may be an image of the plurality of images.

Line segment detection module 1112 may be configured to detect a plurality of 2d line segments in the second image.

Set projecting module 1114 may be configured to project a set of 3d points of the plurality of 3d points as 2d points in the first image. Projecting the set of 3d points may be based on a visibility direction of a first camera associated with the first image. The visibility direction of the first camera may be based on a pose of the first camera. The pose of the first camera may include an orientation of the first camera and a location of the first camera. The visibility direction of the first camera may be the orientation of the first camera.

The visibility direction of the first camera may be calculated by casting a ray from the location of the first camera through a center of the first image. The location of the first camera may be an optical center of the first camera. Projecting the set of 3d points may be further based on the visibility directions of the plurality of 3d points. Projecting the set of 3d points may be further based on distances between the plurality of 3d points and a location of a first camera associated with the first image. The location of the first camera may be an optical center of the first camera. Projecting the set of 3d points may include computing the distances between the plurality of 3d points and the location of the first camera.

Projecting the set of 3d points may include projecting a 3d point of the plurality of 3d points responsive to a distance between the 3d point of the plurality of 3d points and the location of the first camera being less a threshold distance. Projecting the set of 3d points may be based on scene understanding. Each 3d point of the plurality of 3d points may include metadata describing classifications of the 3d point. Each 2d point of the first image may include metadata describing classifications of the 2d point. The classifications may include at least one of façade faces or building structure features. By way of non-limiting example, the façade may face include at least one of front façade, back façade, left façade, or right façade.

By way of non-limiting example, the building structure features may include at least one of eave, ridge, rake, post, fascia, soffit, or window. Projecting the set of 3d points may include projecting a 3d point of the plurality of 3d points responsive to a classification of the 3d point matching a classification of a 2d point of the image that the 3d point would be projected onto.

Point selection module 1116 may be configured to select projected 3d points that are proximate to 2d points along the 2d line segment.

Line segment generating module 1118 may be configured to generate a 3d line segment by connecting 3d points of the point cloud represented by the selected projected 3d points. Projecting the set of 3d points may include comparing the classifications of the 3d points of the plurality of 3d points to the classifications of the 2d points of the first image. Projecting the 3d line segment may include projecting the 3d line segment as a 2d line segment in the segmented image. Projecting the 3d line segment may be based on a visibility direction associated with the second image. The visibility direction of the second camera may be based on a pose of the second camera.

The pose of the second camera may include an orientation of the second camera and a location of the second camera. The visibility direction of the second camera may be the orientation of the second camera. The visibility direction of the second camera may be calculated by casting a ray from the location of the second camera through a center of the second image. The location of the second camera may be an optical center of the second camera. The 3d line segment may include an associated visibility. Projecting the 3d line segment may be further based on the visibility direction of the 3d line segment.

The visibility direction of the 3d line segment may be based on visibility directions associated with the 3d points of the point cloud represented by the selected projected 3d points. Projecting the 3d line segment may include comparing the visibility direction of the 3d line segment to the visibility direction of the second image. Projecting the 3d line segment may include projecting the 3d line segment responsive to the visibility direction of the 3d line segment corresponding to the visibility direction of the second image. The visibility direction of the 3d line segment may correspond to the visibility direction of the second image when the visibility direction of the 3d line segment is less than orthogonal to the visibility direction of the second image. Projecting the 3d line segment may be further based on a distance between the 3d line segment and a location of a second camera associated with the second image. Projecting the 3d line segment may include computing the distance between the 3d line segment and the location of the second camera.

Projecting the 3d line segment may include projecting the 3d line segment responsive to a distance between the 3d line segment and the location of the second camera being less than a threshold distance. Computing the distance between the 3d line segment and the location of the second camera may be based on distances between the 3d points of the point cloud represented by the selected projected 3d points and the location of the second camera. Projecting the 3d line segment may be based on scene understanding.

Camera pose receiving module 1120 may be configured to receive a plurality of camera poses associated with the plurality of images.

Image segmentation module 1122 may be configured to segment the plurality of images.

Image segmentation module 1122 may be configured to segment the second image.

Line segment projecting module 1124 may be configured to project the 3d line segment as a 2d line segment in the first image.

Line segment projecting module 1124 may be configured to project the 3d line segment as a 2d line segment in the second image. The 2d line segment in the first image may be a straight gradient within the first image that is greater than a threshold length. Selecting projected 3d points may include selecting projected 3d points that are within a threshold distance of the points of the 2d line segment. The threshold distance may be relative to a 2d coordinate system of the first image. The 2d coordinate system of the first image may be an image plane of the first image.

The threshold distance may be relative to a plane of a 3d coordinate system. The plane of the 3d coordinate system may be an image plane of the first image. Selecting the projected 3d points may include selecting projected 3d points that are proximate to end points of the 2d line segment.

Image display module 1126 may be configured to display the first image. Displaying the first image may include displaying the projected 3d line segment.

Image display module 1126 may be configured to display the second image. Displaying the second image may include displaying the projected 3d line segment.

Line segment selection module 1128 may be configured to select the projected 3d line segment responsive to the projected 3d line segment substantially aligning with at least one 2d line segment of the plurality of 2d line segments in the second image.

In some implementations, computing platform(s) 1102, remote platform(s) 1104, and/or external resources 1130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1102, remote platform(s) 1104, and/or external resources 1130 may be operatively linked via some other communication media.

A given remote platform 1104 may include one or more processors configured to execute computer program modules. The computer program modules may be configured to enable an expert or user associated with the given remote platform 1104 to interface with system 1100 and/or external resources 1130, and/or provide other functionality attributed herein to remote platform(s) 1104. By way of non-limiting example, a given remote platform 1104 and/or a given computing platform 1102 may include one or more of a server, a desktop computer, a laptop computer, a handheld computer, a tablet computing platform, a NetBook, a Smartphone, a gaming console, and/or other computing platforms.

External resources 1130 may include sources of information outside of system 1100, external entities participating with system 1100, and/or other resources. In some implementations, some or all of the functionality attributed herein to external resources 1130 may be provided by resources included in system 1100.

Computing platform(s) 1102 may include electronic storage 1132, one or more processors 1134, and/or other components. Computing platform(s) 1102 may include communication lines, or ports to enable the exchange of information with a network and/or other computing platforms. Illustration of computing platform(s) 1102 in FIG. 11 is not intended to be limiting. Computing platform(s) 1102 may include a plurality of hardware, software, and/or firmware components operating together to provide the functionality attributed herein to computing platform(s) 1102. For example, computing platform(s) 1102 may be implemented by a cloud of computing platforms operating together as computing platform(s) 1102.

Electronic storage 1132 may comprise non-transitory storage media that electronically stores information. The electronic storage media of electronic storage 1132 may include one or both of system storage that is provided integrally (i.e., substantially non-removable) with computing platform(s) 1102 and/or removable storage that is removably connectable to computing platform(s) 1102 via, for example, a port (e.g., a USB port, a firewire port, etc.) or a drive (e.g., a disk drive, etc.). Electronic storage 1132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1132 may include one or more virtual storage resources (e.g., cloud storage, a virtual private network, and/or other virtual storage resources). Electronic storage 1132 may store software algorithms, information determined by processor(s) 1134, information received from computing platform(s) 1102, information received from remote platform(s) 1104, and/or other information that enables computing platform(s) 1102 to function as described herein.

Processor(s) 1134 may be configured to provide information processing capabilities in computing platform(s) 1102. As such, processor(s) 1134 may include one or more of a digital processor, an analog processor, a digital circuit designed to process information, an analog circuit designed to process information, a state machine, and/or other mechanisms for electronically processing information. Although processor(s) 1134 is shown in FIG. 11 as a single entity, this is for illustrative purposes only. In some implementations, processor(s) 1134 may include a plurality of processing units. These processing units may be physically located within the same device, or processor(s) 1134 may represent processing functionality of a plurality of devices operating in coordination. Processor(s) 1134 may be configured to execute modules 1108, 1110, 1112, 1114, 1116, 1118, 1120, 1122, 1124, 1126, and/or 1128, and/or other modules. Processor(s) 1134 may be configured to execute modules 1108, 1110, 1112, 1114, 1116, 1118, 1120, 1122, 1124, 1126, and/or 1128, and/or other modules by software; hardware; firmware; some combination of software, hardware, and/or firmware; and/or other mechanisms for configuring processing capabilities on processor(s) 1134. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1108, 1110, 1112, 1114, 1116, 1118, 1120, 1122, 1124, 1126, and/or 1128 are illustrated in FIG. 11 as being implemented within a single processing unit, in implementations in which processor(s) 1134 includes multiple processing units, one or more of modules 1108, 1110, 1112, 1114, 1116, 1118, 1120, 1122, 1124, 1126, and/or 1128 may be implemented remotely from the other modules. The description of the functionality provided by the different modules 1108, 1110, 1112, 1114, 1116, 1118, 1120, 1122, 1124, 1126, and/or 1128 described below is for illustrative purposes, and is not intended to be limiting, as any of modules 1108, 1110, 1112, 1114, 1116, 1118, 1120, 1122, 1124, 1126, and/or 1128 may provide more or less functionality than is described. For example, one or more of modules 1108, 1110, 1112, 1114, 1116, 1118, 1120, 1122, 1124, 1126, and/or 1128 may be eliminated, and some or all of its functionality may be provided by other ones of modules 1108, 1110, 1112, 1114, 1116, 1118, 1120, 1122, 1124, 1126, and/or 1128. As another example, processor(s) 1134 may be configured to execute one or more additional modules that may perform some or all of the functionality attributed below to one of modules 1108, 1110, 1112, 1114, 1116, 1118, 1120, 1122, 1124, 1126, and/or 1128.

Figure 12:
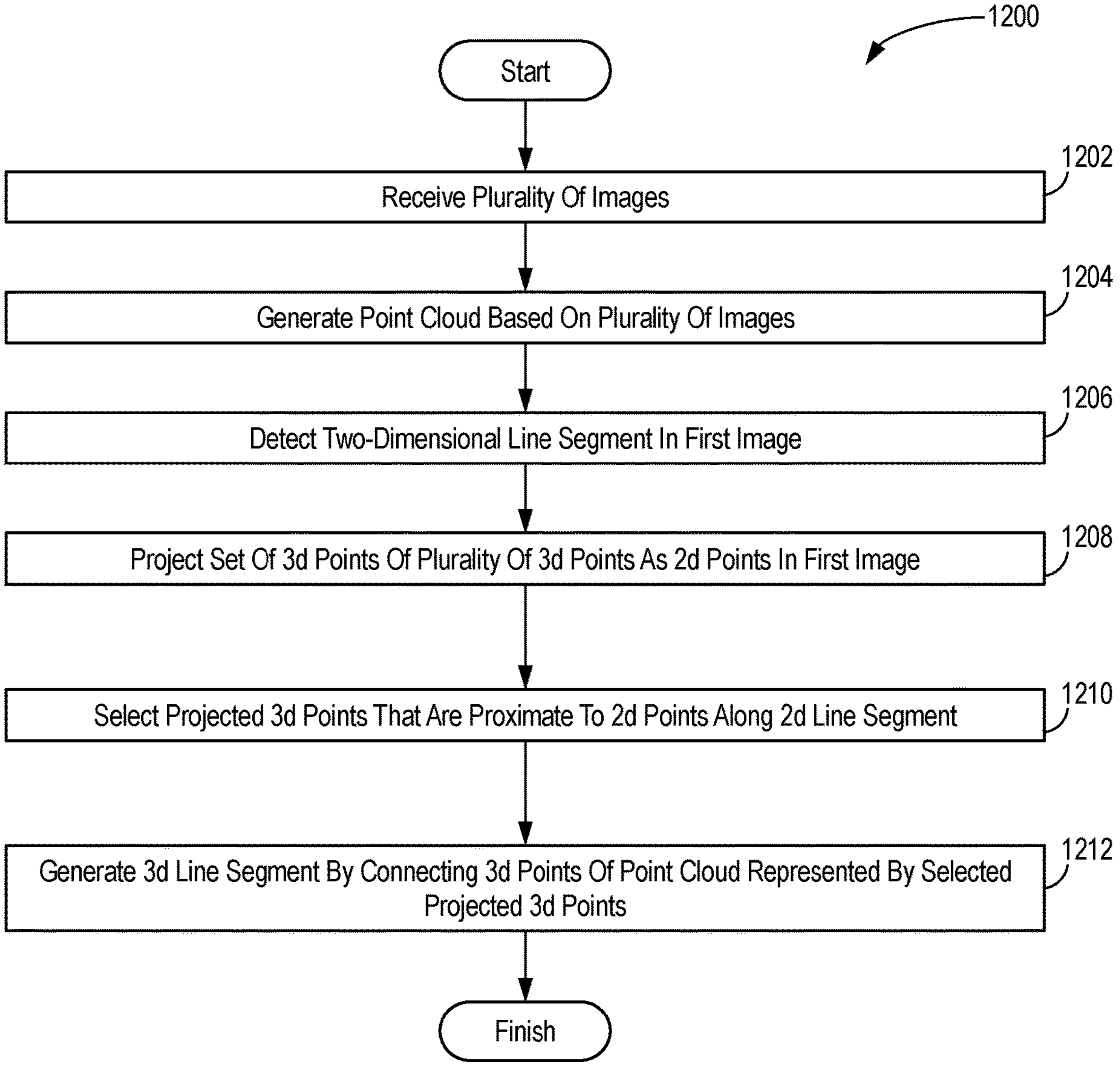
FIG. 12 illustrates a method for generating a three-dimensional line segment, according to some embodiments.

FIG. 12 illustrates a method 1200 for generating a three-dimensional line segment, in accordance with one or more implementations. The operations of method 1200 presented below are intended to be illustrative. In some implementations, method 1200 may be accomplished with one or more additional operations not described, and/or without one or more of the operations discussed. Additionally, the order in which the operations of method 1200 are illustrated in FIG. 12 and described below is not intended to be limiting.

In some implementations, method 1200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 1200 in response to instructions stored electronically on an electronic storage medium. The one or more processing devices may include one or more devices configured through hardware, firmware, and/or software to be specifically designed for execution of one or more of the operations of method 1200.

An operation 1202 may include receiving a plurality of images. Operation 1202 may be performed by one or more hardware processors configured by machine-readable instructions including a module that is the same as or similar to image receiving module 1108, in accordance with one or more implementations.

An operation 1204 may include generating a point cloud based on the plurality of images. The point cloud may include a plurality of 3d points. Operation 1204 may be performed by one or more hardware processors configured by machine-readable instructions including a module that is the same as or similar to point cloud generating module 1110, in accordance with one or more implementations.

An operation 1206 may include detecting a two-dimensional line segment in a first image. Operation 1206 may be performed by one or more hardware processors configured by machine-readable instructions including a module that is the same as or similar to line segment detection module 1112, in accordance with one or more implementations.

An operation 1208 may include projecting a set of 3d points of the plurality of 3d points as 2d points in the first image. Operation 1208 may be performed by one or more hardware processors configured by machine-readable instructions including a module that is the same as or similar to set projecting module 1114, in accordance with one or more implementations.

An operation 1210 may include selecting projected 3d points that are proximate to 2d points along the 2d line segment. Operation 1210 may be performed by one or more hardware processors configured by machine-readable instructions including a module that is the same as or similar to point selection module 1116, in accordance with one or more implementations.

An operation 1212 may include generating a 3d line segment by connecting 3d points of the point cloud represented by the selected projected 3d points. Operation 1212 may be performed by one or more hardware processors configured by machine-readable instructions including a module that is the same as or similar to line segment generating module 1118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claim is:

1. A method for generating a three-dimensional (3d) line segment, the method comprising:
- receiving a plurality of images;
- generating a point cloud based on the plurality of images, wherein the point cloud comprises a plurality of 3d points;
- detecting a two-dimensional (2d) line segment in a first image;
- projecting a set of 3d points of the plurality of 3d points as 2d points in the first image;
- selecting projected 3d points that are geometrically proximate to 2d points of the 2d line segment;
- generating a 3d line segment by connecting the selected projected 3d points of the point cloud.

2. The method of claim 1, wherein projecting the set of 3d points is based on a visibility direction of a first camera associated with the first image.

3. The method of claim 2, wherein the visibility direction of the first camera is based on an orientation of the first camera.

4. The method of claim 3, wherein the visibility direction of the first camera is calculated by casting a ray from an optical center of the first camera through a center of the first image.

5. The method of claim 2,
- wherein the plurality of 3d points comprise associated visibility directions; and
- wherein projecting the set of 3d points is further based on the visibility directions of the plurality of 3d points.

6. The method of claim 5, wherein projecting the set of 3d point comprises:
- comparing the visibility directions of the plurality of 3d points to the visibility direction of the first camera; and
- projecting a 3d point of the plurality of 3d points responsive to a visibility direction of the 3d point corresponding to the visibility direction of the first camera.

7. The method of claim 6, wherein the visibility direction of the 3d point corresponds to the visibility direction of the first camera when the visibility direction of the 3d point is less than orthogonal to the visibility direction of the first camera.

8. The method of claim 5, wherein a visibility direction of a 3d point of the plurality of 3d points is based in visibility directions of cameras associated with images of the plurality of images that were used to generate the 3d point of the plurality of 3d points.

9. The method of claim 8, wherein the visibility direction of the 3d point of the plurality of 3d points is calculated based on a mean of normalized differences between the 3d point and poses associated with the images of the plurality of images that were used to generate the 3d point of the plurality of 3d points.

10. The method of claim 1, wherein projecting the set of 3d points comprises:

computing the distances between the plurality of 3d points and the location of a first camera; and projecting a 3d point of the plurality of 3d points responsive to a distance between the 3d point of the plurality of 3d points and a location of the first camera being less than a threshold distance.

11. The method of claim 1, wherein projecting the set of 3d points is based on scene understanding.

12. The method of claim 11, wherein each 3d point of the plurality of 3d points comprises metadata describing classifications of the 3d point, and wherein each 2d point of the first image comprises metadata describing classifications of the 2d point.

13. The method of claim 12, wherein projecting the set of 3d points comprises:

comparing the classifications of the 3d points of the plurality of 3d points to the classifications of the 2d points of the first image; and projecting a 3d point of the plurality of 3d points responsive to a classification of the 3d point matching a classification of a 2d point of the image that the 3d point would be projected onto.

14. The method of claim 1, wherein selecting projected 3d points that are geometrically proximate comprises selecting projected 3d points that are within a threshold distance of the points of the 2d line segment.

15. The method of claim 14, wherein selecting projected 3d points that are geometrically proximate comprises:

calculating a mean or a median distance of the distances between the projected 3d points within the predetermined threshold distance and the 2D point along the 2D line segment.

16. The method of claim 15, further comprising selecting projected 3d points that are closest to the mean or the median distance from the 2d points of the 2D line segment.

17. The method of claim 15, further comprising selecting one or more new 3d points in the point cloud generated based on the mean or the median distance.

18. The method of claim 17, wherein generating the 3d line segment comprises connecting the new 3d points of the point cloud.

19. The method of claim 1, wherein selecting the projected 3d points that are geometrically proximate comprises selecting projected 3d points that are proximate to end points of the 2d line segment.

20. The method of claim 1, further comprising:

projecting the 3d line segment as a 2d line segment in the first image; and displaying the first image, wherein displaying the first image comprises displaying the projected 3d line segment.

21. The method of claim 1, wherein selecting projected 3d points that are geometrically proximate comprises selecting projected 3d points that are closest to points of the 2D line segment.

* * * * *